(No Model.)
R. BUSTIN.
HOT WATER BANDAGE FOR TREATING HORSES.
No. 530,085. Patented Dec. 4, 1894.
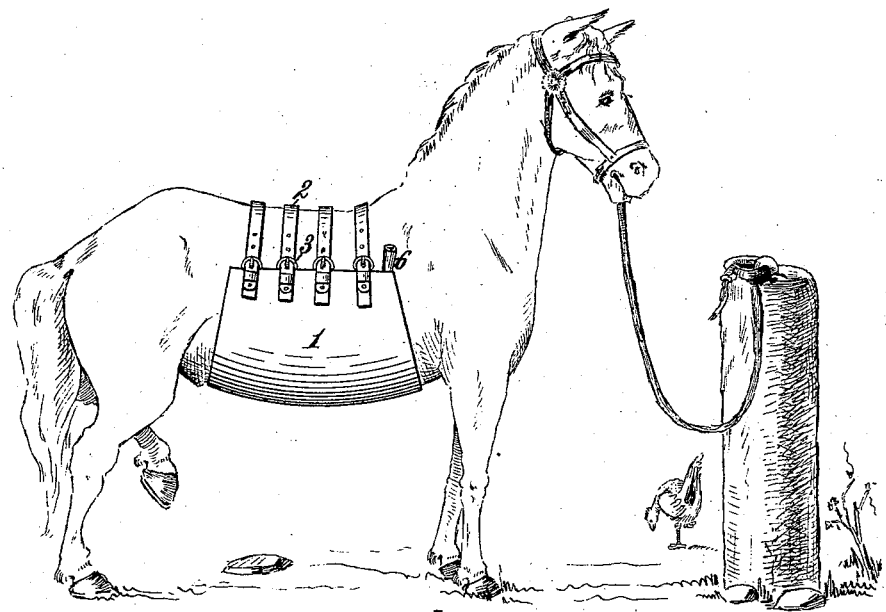
FIG. 1.
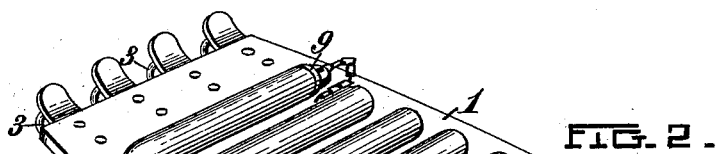
FIG. 2.
FIG. 3.
Witnesses
Dennis Sumby
Robert Everett
Inventor
Robert Bustin
By James L. Norris
Atty.

UNITED STATES PATENT OFFICE.

ROBERT BUSTIN, OF BOSTON, MASSACHUSETTS, ASSIGNOR OF TWO-THIRDS TO JOHN R. McCONNELL AND JAMES A. VAN WART, OF ST. MARY'S, FREDERICTON, CANADA.

HOT-WATER BANDAGE FOR TREATING HORSES.

SPECIFICATION forming part of Letters Patent No. 530,085, dated December 4, 1894.

Application filed June 4, 1894. Serial No. 513,422. (No model.)

*To all whom it may concern:*

Be it known that I, ROBERT BUSTIN, a subject of the Queen of Great Britain, residing at Boston, in the county of Suffolk and State of Massachusetts, have invented new and useful Improvements in Hot-Water Appliances for Treating Horses, &c., of which the following is a specification.

My invention relates to hot water appliances for treating horses and other animals for the relief and cure of those complaints in which local application of artificial heat is indicated as the proper and most efficient remedy.

It is the purpose of my invention to provide simple means for the speedy relief and ultimate cure of those diseases in horses and other animals of which colic is a type, and which usually manifest themselves by severe spasms of pain due to perverted and excessive peristaltic contractions. Horses are peculiarly susceptible to these complaints, and require prompt and efficient treatment to arrest the disorder before it arrives at a stage where cure is extremely difficult, and in most cases impossible. In the early stages of these complaints a topical treatment is usually indicated, as it gives the best and quickest results, and the purpose of my invention is to provide a simple and inexpensive article, or appliance, which may be readily used by any person, without requiring previous experience or training, which is capable of use upon a horse, or upon any other animal, as well as upon the human body, if necessary.

The invention consists, to these ends, in the novel features of construction and in the parts and combinations of parts hereinafter fully described and then particularly pointed out and defined in the claims.

To enable others to fully understand and to make and use my said invention, I will proceed to describe the same in detail, reference being had for such purpose to the accompanying drawings, in which—

Figure 1 is a view showing my invention as it appears when applied to a horse, or other animal. Fig. 2 is a perspective view of the same removed from the animal and extended to exhibit the inner face. Fig. 3 is a transverse sectional view of the parts shown in Fig. 2.

The reference-numeral 1, in said drawings, indicates a pad preferably made of rubber, though other suitable, flexible material may be used. It is usually made of somewhat greater width in its middle portion, to cover the abdomen, and narrowed toward each end. Straps 2 are attached along one end and a corresponding number of buckles 3 are attached at its other end, whereby it may be buckled, closely around the body of the animal and drawn up against the abdominal portion as tightly as may be necessary. Arranged along the inner surface of the pad, transversely to its length, is a series of separate, flexible tubes 4, which are integral with the material of which the pad is composed. The ends of these tubes approach quite near the edges of the pad and upon one side thereof their ends are closed, but upon the other side they all have communication with a flexible pipe 5, each of the individual tubes 4 being an integral part of said pipe, which is also, like said tubes, an integral portion of the pad. At one end of the latter, the pipe 5, which extends along the longitudinal margin of the pad, is provided with an extension 6, which projects beyond the end of said pad. Its extremity is provided with a plug 7, preferably threaded to screw into a suitable bushing 7ª, and connected by a chain 8. I prefer, in most cases, to apply to the pad 1 an outer layer of any suitable material capable of preventing rapid conduction of heat.

The invention is used by filling the tubes 4 and pipe 5 with water heated to the proper temperature, and then strapping the pad upon the animal in the manner shown in Fig. 1, the straps being drawn tightly enough to cause the tubes to press closely upon the abdomen. The local warmth thereby imparted quickly relieves the more severe symptoms and in many instances will effect a cure without medication. When the latter is necessary, the action of the remedies used is assisted and expedited and the animal is rendered manageable by the use of the invention, so that medicines can be administered without difficulty.

I may, and in most cases shall, provide the tube 4 which is at the closed end of the pipe 5, with an opening in its end and a suitable form of plug 9, whereby, should circumstances render it necessary, a tube having a suitable plug may be inserted to siphon off the water in the tubes 4, and enable a fresh supply of hot water to be introduced. Moreover in filling the tubes, when the pad is on the animal, some provision is necessary for the escape of air at one end of the series of pipes, as the fluid enters at the other end, and such provision is afforded by the opening having the plug 9. By making the opening at this point, also the tubes can be supplied with warm water while the pad is on the animal without more waste than is necessary. The extension end 6 being at a higher level than the opening at the other end of the series, water poured therein will flow down through the tube 5, drawing with it, by mechanical contact, more or less of the contents of the tubes 4, and the outflow will take place through the end opened by removing the plug 9. In entering the stream being of higher temperature than the water in the several tubes 4, it will slowly displace the same, and will, itself, be displaced, in turn. By introducing a continuous stream at the mouth of the extension 6 and properly controlling its volume, and temperature, the application may be continued without interruption for any length of time.

By making the tubes 4 and pipe 5 in one piece with the pad, I avoid the frequent separation of the same, which is liable to occur from the use of water at high temperatures, when cement is employed to unite the tubes to the pad. I prefer to mold the whole structure, including the pad and the tubes, in a single piece, but I may form the tubes 4 separately and unite them with the pad 1 while in a plastic state, and thus form them, practically, in a single piece with said pad.

What I claim is—

1. An abdominal pad for the treatment of diseases in animals, consisting of a sheet of flexible material having straps and buckles at its ends provided upon one side with a series of tubes all closed at one end and formed or united in one piece with said pad transversely to the length of the latter and a pipe extending along one of the longer sides of the pad and having communication with all of said tubes, at one end of the latter the end of the pipe being bent into parallelism with said tubes at one end of the series and provided with a plug to close the opening in its end, substantially as described.

2. An abdominal pad for the purposes described, consisting of a sheet of rubber having straps and buckles at its ends, a series of tubes arranged transversely to the length of said pad and formed or united in one piece with the latter, a filling pipe arranged along one longitudinal margin of the pad and communicating with one end of all the tubes their other ends being closed, said filling-pipe being integral with the communicating pipes and having its end turned into parallelism with the series of tubes and provided with a plug to close its extremity, the other end of the filling-pipe having an extension closed by a plug, substantially as described.

In testimony whereof I have hereunto set my hand and affixed my seal in presence of two subscribing witnesses.

ROBT. BUSTIN. [L. S.]

Witnesses:
JAMES L. NORRIS,
THOS. A. GREEN.